United States Patent
Martin, Jr.

(10) Patent No.: US 6,418,443 B1
(45) Date of Patent: Jul. 9, 2002

(54) HOT SPOT ANALYSIS OF IMS DATABASES

(75) Inventor: James L. Martin, Jr., Round Rock, TX (US)

(73) Assignee: BMC Software, Houston, TX (US)

( * ) Notice: Subject to any disclaimer, the term of this patent is extended or adjusted under 35 U.S.C. 154(b) by 0 days.

(21) Appl. No.: 09/496,241

(22) Filed: Feb. 1, 2000

(51) Int. Cl.⁷ .............................................. G06F 17/30
(52) U.S. Cl. ...................... 707/101; 707/100; 707/200
(58) Field of Search ............................... 707/100, 101, 707/200

(56) References Cited

U.S. PATENT DOCUMENTS

| | | | | |
|---|---|---|---|---|
| 4,205,371 A | * | 5/1980 | Feather ........................ | 707/101 |
| 5,761,667 A | * | 6/1998 | Koeppen ..................... | 707/101 |
| 5,881,379 A | * | 3/1999 | Beier et al. .................. | 707/101 |
| 5,933,820 A | * | 8/1999 | Beier et al. ..................... | 707/1 |
| 5,991,761 A | * | 11/1999 | Mahoney et al. ............ | 707/100 |

* cited by examiner

Primary Examiner—Greta L. Robinson
(74) Attorney, Agent, or Firm—Conley, Rose & Tayon PC (57) ABSTRACT

A method and system for analyzing the physical characteristics of database records, such as in IMS databases. The information obtained during this analysis may then be used to perform a more efficient reorganization or restructuring of the database. In one embodiment, the method involves tracing the database retrieval process to collect physical location information for each segment of each database record in an IMS database. The database retrieval process for each database record may begin at the root segment of the database record and traverse the child segments of the database record, preferably in hierarchical order, e.g. top to bottom, left to right. The database retrieval process identifies the segment code causing the first reference to a block and the number of segments retrieved from the block before fetching a new block. The physical location information for each segment of each database record in the IMS database may be analyzed to identify one or more segments which represent a fragmented boundary twin chain. Two calculations may be performed for those segments which are boundary twin chains. If the total number of physical blocks currently used to hold the boundary twin chain exceeds the minimum number of physical blocks needed to hold the boundary twin chain by a pre-determined amount, the boundary twin chain may be determined to be fragmented. Similar calculations may be performed for the database record. A reorganization recommendation list for the database record may be created in response to determining whether the database record is fragmented.

70 Claims, 6 Drawing Sheets

HOT SPOT ANALYSIS OF IMS DATABASES

BACKGROUND OF THE INVENTION

1. Field of the Invention

The present invention relates to computer software, and more particularly to analyzing the physical characteristics of database records in IMS databases.

2. Description of the Related Art

The IMS database (IMS DB) was created in 1970 by International Business Machines Corporation (IBM) and is one of the two major parts to IBM's IMS/ESA (Information Management System/EnterpriseSystems Architecture). The second part is a data communications system (IMS Transaction Manager or IMS TM). Together, the transaction manager and the database manager create a complete online transaction processing environment providing continuous availability and data integrity. IMS/ESA runs under the MVS/ESA or OS/390 operating systems, which run on the S/390 platform.

At the heart of IMS DB are its databases and its data manipulation language, Data Language/I (DL/I). The IMS database is a hierarchical (non-relational) database. IMS databases are hierarchic collections of data, information organized in a pyramid fashion with data at each level of the hierarchy related to, and in some way dependent upon, data at the higher level of the hierarchy. DL/I calls allows a user to create and access these IMS databases.

An IMS database may include one or more data set groups. Each data set group may include one or more segments. A segment is the smallest piece of data DL/I can store. Each segment may be qualified by its hierarchical relationship to other segments in a database record. Each database record has one root segment and zero or more child segments. A "root segment" is at the top of the hierarchy, and there may be only one root segment in a database record. All other segments (other than the one root segment) in a database record are referred to as "dependent segments", and their existence depends on there being a root segment. A "parent segment" is any segment that is defined in the database descriptor (DBD) as capable of having a dependent segment beneath it in the hierarchy. A "child segment" is any segment that is a dependent of another segment above it in the hierarchy.

Segments may be of various segment types. Those segments which share similar qualities are of the same type. For example, if the root segment of a database record represents a course, and that root segment has three child segments labeled: instructor, student, and location, those child segments may be referred to as segment types.

The root segment is referred to as a first level of the IMS database, direct children of the root segment are referred to as a second level of the IMS database. As used herein, a second level of the IMS database may alternatively be referred to as a first level child segment, as child segments may only appear starting with the second level of the IMS database. Similarly, children of the children of the root segment (i.e., grandchildren of the root segment) are referred to as a third level of the IMS database, or alternatively, second level child segments. The level of each subsequent generation of children may be determined by incremented the previous level by one (e.g., a fourth level of the IMS database is equivalent to a third level child segment).

When IMS databases are created, definitions of which data set group each segment type is to be written to are specified. Segments of an IMS database may be written into a number of data set groups, e.g., ten data set groups. Each segment type may only be assigned to one data set group. As noted above, a database record is made up of a root segment and child segments. As an IMS database is used, segments and database records are added, modified and deleted. Over time, the child segments of a database record may become scattered across different blocks within a data set group, resulting in slower access times and longer latencies than would occur if the child segments were closer together or contiguous. Reorganizing the location of the various segments of an IMS database such that segments of database records are closer together results in faster access times and shorter latencies.

IMS databases include a maintenance window, wherein the maintenance window is the "off-line" time for an IMS database. It is during the maintenance window, be that on a daily, weekly, monthly, or even less frequent basis, that changes to the structure of an IMS database may be made by a database administrator.

Currently, IMS databases are reorganized while the database is off-line. Also, all database records (i.e., the entire database) are reorganized, as no analysis of the state of each database record occurs. Therefore, database records which currently have their segments stored close together are reorganized, along with database records which currently have their segments scattered across different blocks. In other words, in prior art systems all database records are reorganized whether reorganization is necessary or not.

As noted above, the current techniques of reorganizing IMS databases do not include mechanisms to analyze the physical characteristics of database records in an IMS database before reorganizing the IMS database. Such an analysis may help to determine the benefit to be derived by reorganizing the IMS database. It is desirable, in the interest of efficiently using the maintenance window, to provide a method to determine which database records within an IMS database would benefit from reorganization.

For at least the foregoing reasons, there is a need for an improved system and method for analyzing the physical characteristics of database records in IMS databases, especially for more efficient reorganization of the database records.

SUMMARY OF THE INVENTION

The present invention provides various embodiments of an improved method and system for analyzing the physical characteristics of database records, such as in IMS databases. The information obtained during this analysis may then be used to perform a more efficient reorganization or restructuring of the database.

In one embodiment, the method involves tracing the database retrieval process to collect physical location information for each segment of each database record in the IMS database. The database retrieval process for each database record may begin at the root segment of the database record and traverse the child segments of the database record, preferably in hierarchical order, e.g. top to bottom, left to right. The database retrieval process identifies the segment code causing the first reference to a block and the number of segments retrieved from the block before fetching a new block. The physical location information for each segment of each database record in the IMS database may be analyzed to identify one or more database records which include at least one fragmented boundary twin chain. A twin chain is a collection of segments of the same type that have the same parent. A boundary parent segment is a parent segment, other than a root segment, that exists in a data set group as the lowest level segment in the data set group (i.e., all children of the parent segment are in a different data set group). If two or more boundary parent segments exist under the same parent, the boundary parent segments may also be referred to as a boundary twin chain. A boundary child segment is a non-parent segment that exists as the lowest level segment in the database hierarchy. Boundary child segments may reside in any data set group. Boundary child or boundary parent segments may also be referred to as boundary twin chains when a second segment of a particular segment type is created. A fragmented boundary twin chain is a boundary twin chain that spans more blocks than actually required.

Next, two calculations may be performed for those segments which are boundary twin chains. The first calculation may determine a total number of physical blocks currently used to hold the boundary twin chain. The second calculation may determine a minimum number of physical blocks needed to hold the boundary twin chain. If the total number of physical blocks currently used to hold the boundary twin chain exceeds the minimum number of physical blocks needed to hold the boundary twin chain by a predetermined amount, e.g., using a pre-determined ratio or by a pre-determined number of physical blocks, the boundary twin chain may be determined to be fragmented. Similar calculations may be performed for the database record. If the total number of physical blocks currently used to hold the database record exceeds the minimum number of physical blocks needed to hold the database record by a pre-determined amount, e.g., a number of physical blocks, the database record may be determined to be fragmented.

A reorganization recommendation list for the database record may be created in response to determining whether the database record may be fragmented. The reorganization recommendation list may contain values for a minimum and a currently used number of blocks for the database record, along with recommendations (i.e., "yes": reorganize, "no": do not reorganize) for the database record and for each fragmented boundary twin chain in the database record. Thus the reorganization recommendation list may specify one or more records to be reorganized.

The system and method may then reorganize the database based on the reorganization recommendation list. This reorganization may reorganize only a subset of the database records, and may occur while the database is being actively used, e.g., not in the maintenance window.

BRIEF DESCRIPTION OF THE DRAWINGS

A better understanding of the present invention can be obtained when the following detailed description of various embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Figure 1:
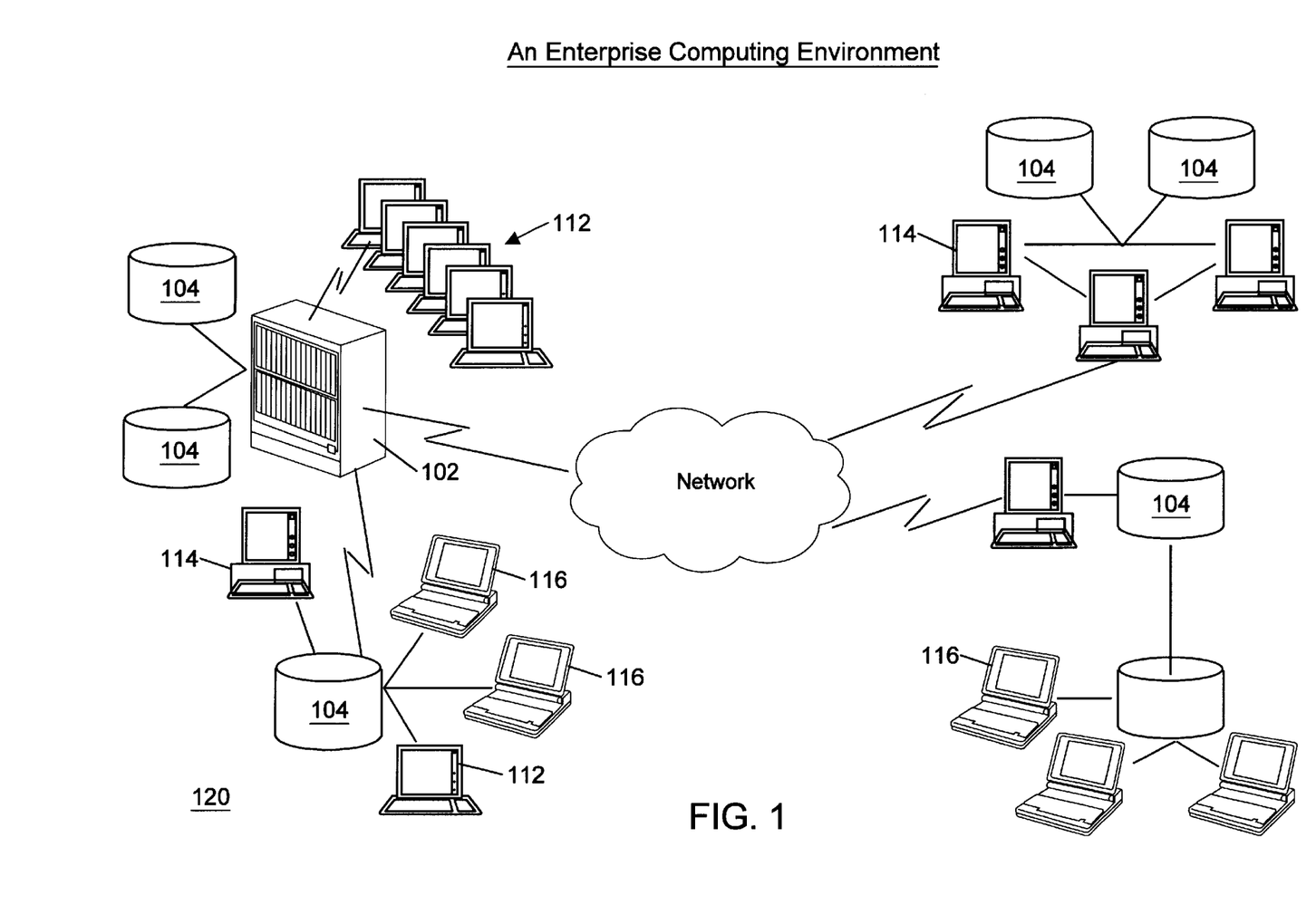
FIG. 1 illustrates an enterprise computing environment.

FIG. 1: An Enterprise Computing Environment

FIG. 1 illustrates an enterprise computing environment according to one embodiment of the present invention. As shown, the enterprise computing environment may include one or more mainframe computers 102 which each include one or more storage devices 104, also referred to as direct access storage devices (DASD). A plurality of computer systems or terminals 112 may be coupled to the mainframe computer 102, wherein the computer systems or terminals 112 access data stored in the storage devices 104 coupled to or comprised in the mainframe computer 102.

The mainframe computer system 102 may be coupled to one or more other computer systems and/or computer networks. The mainframe computer system 102 may be coupled locally to a computer system network 120 in a local area network (LAN) configuration, or may be coupled to one or more computer systems and/or networks through a wide area network (WAN). As shown in FIG. 1, the mainframe computer system 102 may be directly coupled to a local area network 120, such as a PC-based or client/server based network. The LAN 120 may comprise a storage device or file server 104 coupled to one or more desktop computer systems 114, one or more portable computer systems 116 and possibly one or more computer systems or terminals 112. As also shown in FIG. 1, the mainframe computer 102 may also be coupled through a wide area network, represented by the "cloud" in FIG. 1, to one or more additional local area networks, such as PC-based networks as shown. Each of the PC based networks may comprise one or more storage devices or file servers 104 and one or more of either desktop computer systems 114 or portable computer systems 116. The wide area network may be any of various types, such as the Internet.

Each of the one or more mainframe computer systems 102, the computer systems 114 and 116, as well as file servers 104 may include various components as is standard in computer systems. For example, the mainframe computer system 102 may include one or more processors or CPUs, preferably multiple CPUs, as well as non-volatile memory, such as represented by elements 104, and various internal buses etc. as is well known in the art. In a similar manner, each of the desktop computer systems 114 and/or portable computer systems 116, or other computer systems comprised in the enterprise, comprise various standard computer components including one or more CPUs, one or more buses, memory, a power supply and non-volatile memory. The computer systems or terminals 112 may comprise standard "dumb" terminals as used with mainframes, i.e., may comprise a display and video hardware and/or memory for displaying data on the display provided from the mainframe computer system 102.

The mainframe computer system 102 may store a database comprising data which is desired to be accessible among a portion or all of the enterprise, e.g., is desired to be accessible by one or more of the computer systems 114 and 116. In the present application, the term "database" includes both databases and data sets, such as an IMS data set, among others. In one embodiment, the database stored in the mainframe computer system 102 is desired to be distributed among one or more of the various file servers 104 connected to the various computer systems 114 and 116. Thus, it is desired that the data comprising the database be distributed among the enterprise for ready access among multiple users. It is also possible that multiple different database management systems are used within the enterprise, i.e., one or more of the file systems 104 may store its own database which is desired to be replicated among various of the other file servers and/or the mainframe computer system 102.

The present invention preferably comprises one or more software programs which analyze physical characteristics of database records stored in a database, such as an IMS database, in the mainframe computer system 102 and/or one or more of the computer systems 114, 116 or 104 which operate to provide various services. The software programs which analyze physical characteristics of database records in an IMS database are preferably comprised on the mainframe computer system 102. However, it is noted that portions of the software programs which analyze physical characteristics of database records in an IMS database may be distributed throughout one or more computers in the enterprise. Also, the software programs which analyze physical characteristics of database records in an IMS database preferably interface to one or more various OEM utilities. The software programs preferably analyze physical characteristics of database records in an IMS database.

One or more of the computer systems 102, 112, 114, and 116 preferably include a memory medium on which computer programs according to the invention may be stored. The term "memory medium" is intended to include an installation medium, e.g., a CD-ROM, or floppy disks, a computer system memory such as DRAM, SRAM, EDO RAM, Rambus RAM, etc., or a non-volatile memory such as a magnetic media, e.g., a hard drive, "DASD", or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer systems 102/104, 112, 114, and 116 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program or programs which analyze physical characteristics of database records in an IMS database as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A computer system executing code and data from the memory medium comprises a means for analyzing physical characteristics of database records in a database according to the methods and/or block diagrams described below.

Various embodiments further include receiving or storing instructions and/or data implemented in accordance with the foregoing description upon a carrier medium. Suitable carrier media include storage media or memory media such as magnetic or optical media, e.g., disk or CD-ROM, as well as signals such as electrical, electromagnetic, or digital signals, conveyed via a communication medium such as networks 102 and/or 104 and/or a wireless link.

In the preferred embodiment, the present invention comprises one or more software components, preferably a plurality of software components, which operate to provide various analyses of physical characteristics of database records in an IMS database.

The system and method of the present invention makes opportunistic use of database maintenance time. According to one embodiment of the present invention, a DBA (Data Base Administrator) is able to take advantage of the minimal windows (the maintenance window) available for operational database fuinctions to perform reorganizations, copies, moves, data extractions, transformations and loads. DBAs are thus able to perform a variety of maintenance and data management functions at the same time for improved efficiency.

Figure 2A:
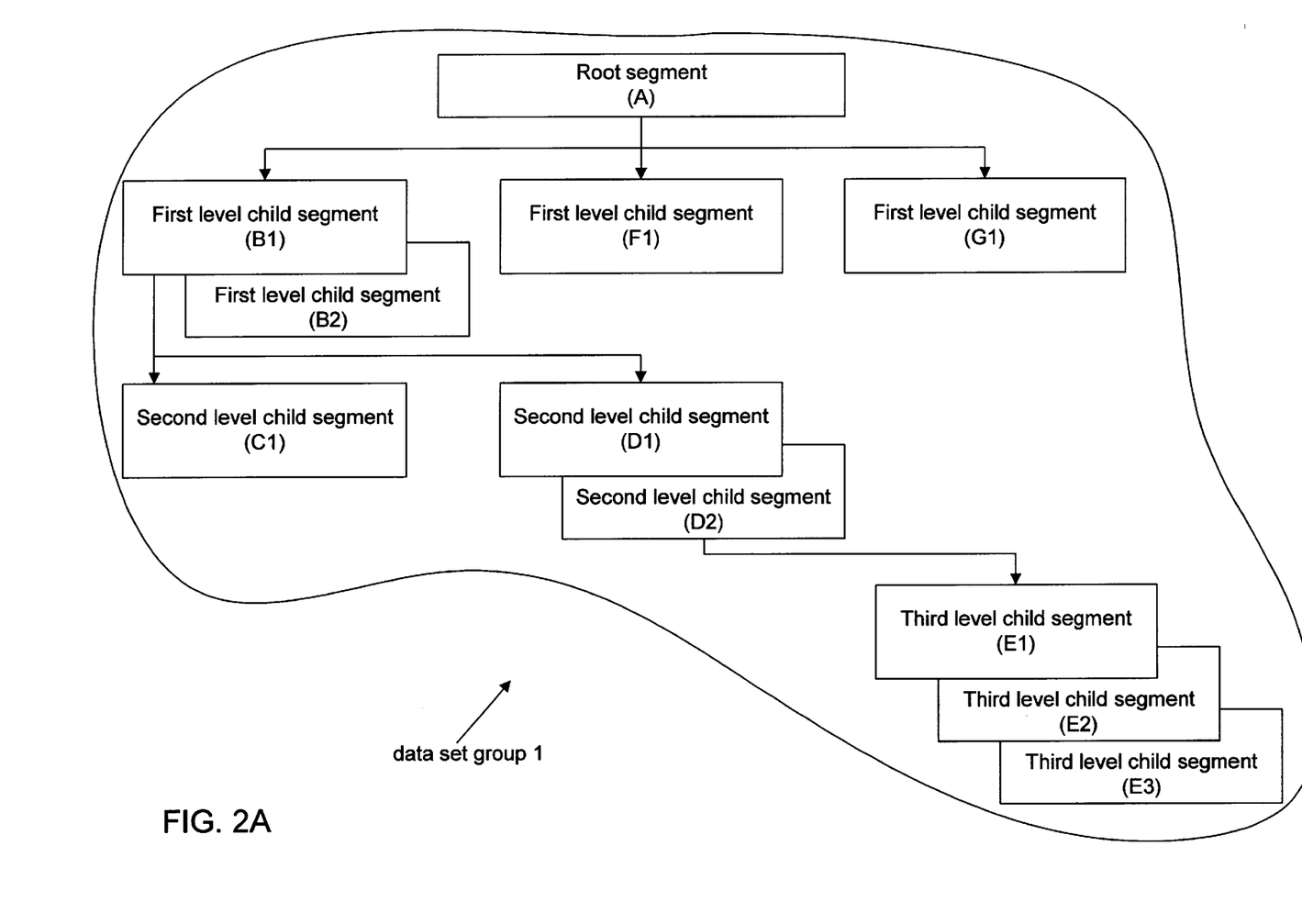
FIGS. 2A–2C illustrate various configurations of a sample IMS database.
Figure 2B:
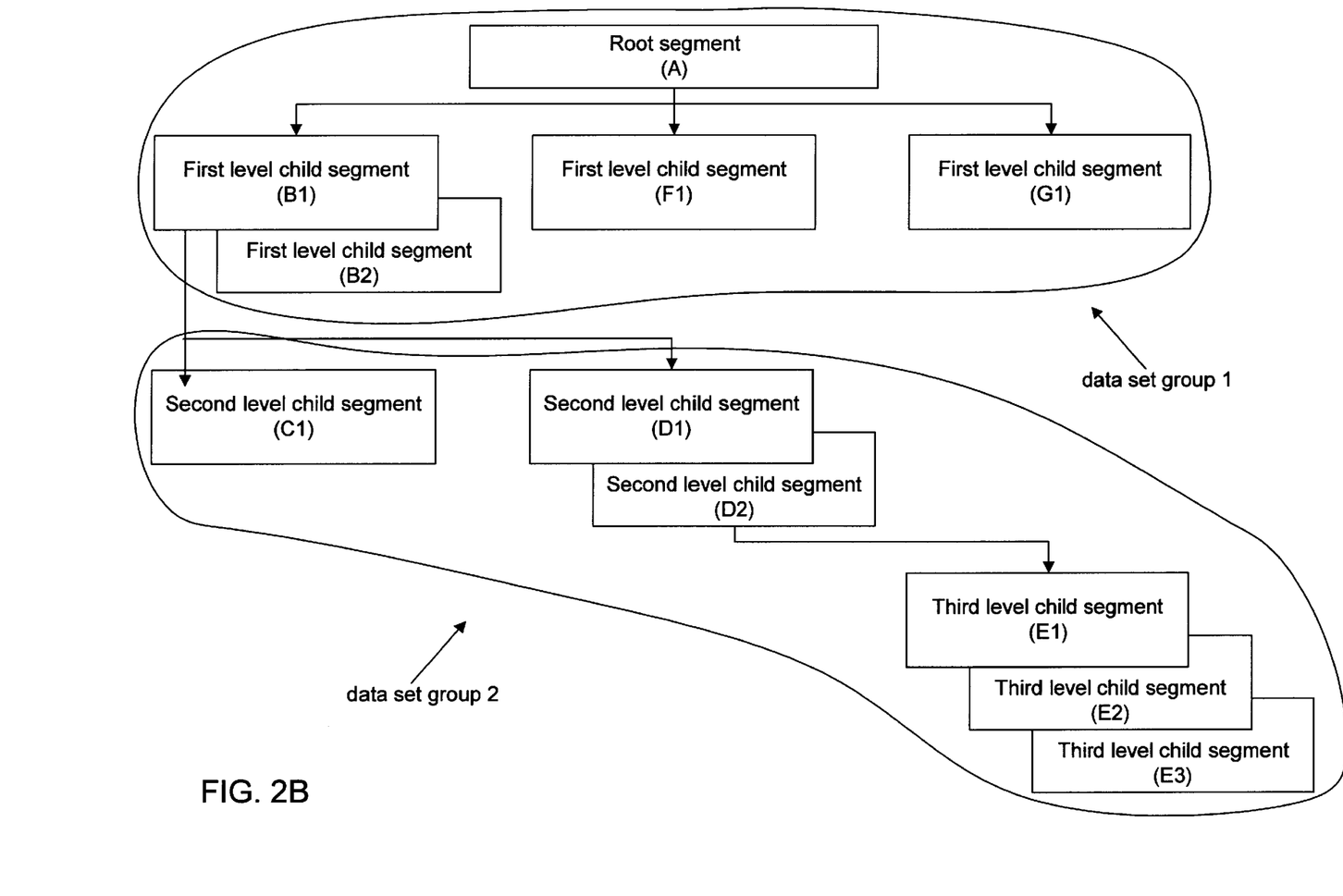
Figure 2C:
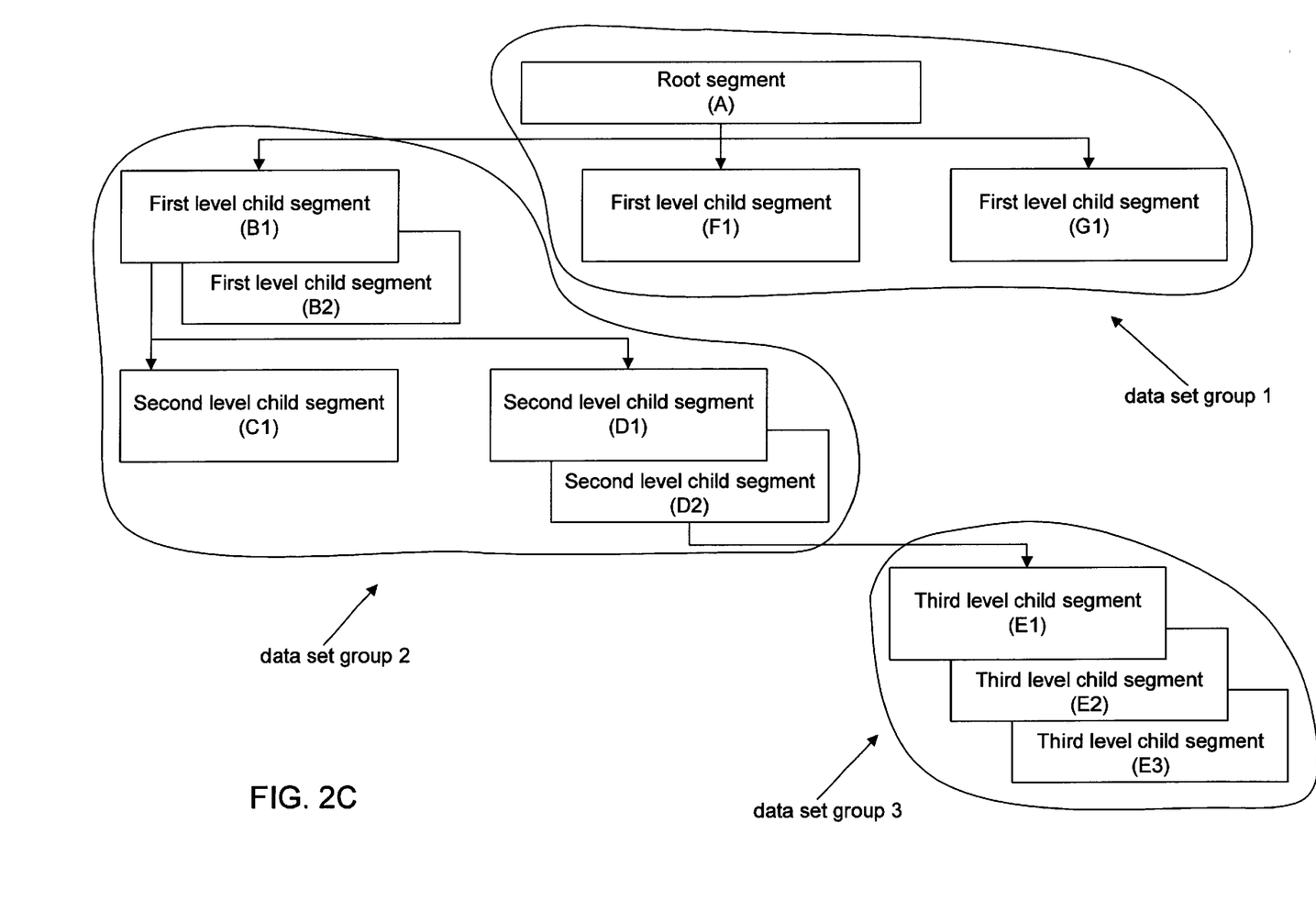

FIGS. 2A–2C: Sample IMS Database

FIGS. 2A–2C illustrate various configurations of a sample IMS database. When IMS databases are created, the database definition process assigns data set group numbers, starting at data set group 1. When a 'dataset' control card is found, the database definition process increments the data set group number to the next number (e.g., from data set group 1 to data set group 2). The root segment is always in data set group 1.

Referring to the sample IMS database of FIGS. 2A–2C, three examples follow. Example #1 in FIG. 2A has all of the segment types of the sample IMS database in one data set group; Example #2 in FIG. 2B has all the segment types of the sample IMS database in two data set groups; and lastly, Example #3 in FIG. 2C has all the segment types of the sample IMS database in three data set groups.

There are seven segment types defined in the sample IMS database of FIGS. 2A–2C, A through G. It is noted that there are eleven segments, distributed across the seven segment types such that four segment types (F, G, C, and E) are boundary child segments. Following these eleven segments in hierarchical order, they are: a root (A) segment, a first level child (B1) segment, a second level child (C1) segment, a second level child (D1) segment, a second level child (D2) segment, a third level child (E1) segment, a third level child (E2) segment, a third level child (E3) segment, a first level child (B2) segment, a first level child (F1) segment, and a first level child (G1) segment. As used herein, a "twin chain" is a plurality of segments of the same segment type that have the same physical parent segment. The parent segment for the "B" twin chain is the root (A) segment. Similarly, the parent segment for the "D" twin chain is the first level child (B1) segment. The parent segment for the "E" twin chain is the second level child (D2) segment. As used herein, a "boundary parent segment" is a parent segment, other than a root segment, that exists in a data set group as the lowest level segment in the data set group (i.e., all children of the parent segment are in a different data set group). As used herein, a "boundary child segment" is a non-parent segment that exists as the lowest level segment in the database hierarchy. Boundary child segments may reside in any data set group. Boundary child or boundary parent segments may also be referred to as boundary twin chains when a second segment of a particular segment type is created.

During initial loading or reorganization of an IMS database, space may be assigned to each segment as it is inserted. Segments are loaded in hierarchical order: top to bottom, left to right. After the IMS database is loaded, maintenance actions (i.e., inserts, updates, or deletes) may result in disorganization in terms of blocks used to blocks needed. This disorganization may occur due to the combination of the distribution of segments across segment types and the distribution of segment types across data set groups. It is likely that the only segments to be packed adjacent to each other are segments that do not have any dependent (i.e., next level child) segments. If a twin chain of these segments spans more than one block and these twin chain segments are actually small enough to fit in fewer blocks than they are currently distributed over, it is likely that better block organization may be obtained by reorganization of either the segment twin chain or the entire database record.

FIG. 2A: Example #1: One Data Set Group

In this example, all seven segment types are in one data set group (data set group 1). It is noted that there is no boundary parent segment in this example. Boundary child segments exist at the lowest level segment in the database hierarchy, namely at segment types C, E, F and G. Of these four segment types, only E has more than one segment. Segment types C, F, and G each have only one segment. It is noted that having only one segment does not prohibit a segment type from being a boundary twin segment type. Boundary child segment populations which include only one segment are not disorganized, and therefore would not benefit from reorganization. The three third level child segments (E1, E2, E3) are boundary child segments. As noted above, if the segment type E boundary twin chain spans more than one block and the segment type E boundary child segments are actually small enough to fit in fewer blocks than they are currently distributed over, it is likely that better block organization may be obtained by reorganization of either the segment type E boundary twin chain or the entire database record.

FIG. 2B: Example #2: Two Data Set Groups

In this example, four of the seven segment types (A, B, F, G) are in one data set group (data set group 1) and the remaining three segment types (C, D, E) are in another data set group (data set group 2). The lowest level segments within data set group 1 are the first level child segments. The B segment type is a boundary parent segment. All of the children of the parent segment B1 are in a different data set group from their parent (i.e., the B1 segment is in data set group 1 and the children of the B1 segment are in data set group 2). Since there is more than one segment of type B (i.e., B1 and B2), the type B segment may also be referred to as a boundary twin chain, as noted above. As such, if the segment type B boundary twin chain spans more than one block and the segment type B boundary parent segments are actually small enough to fit in fewer blocks than they are currently distributed over, it is likely that better block organization may be obtained by reorganization of either the segment type B boundary twin chain or the entire database record. The F and G segment types are boundary child segments, as noted above in FIG. 2A. Segment types F and G each have only one segment. It is noted that having only one segment does not prohibit a segment type from being a boundary child segment type. Boundary child segment populations which include only one segment are not disorganized, and therefore would not benefit from reorganization.

In data set group 2, there are no boundary parent segments. The second level child segment type C and the third level child segment type E are both boundary child segments, as noted above in FIG. 2A. Segment type C has only one segment. It is noted that having only one segment does not prohibit a segment type from being a boundary child segment type. Boundary child segment populations which include only one segment are not disorganized, and therefore would not benefit from reorganization. The three third level child segments (E1, E2, E3) are boundary child segments. As noted above, if the segment type E boundary twin chain spans more than one block and the segment type E boundary child segments are actually small enough to fit in fewer blocks than they are currently distributed over, it is likely that better block organization may be obtained by reorganization of either the segment type E boundary twin chain or the entire database record.

FIG. 2C: Example #3: Three Data Set Groups

In this example, three of the seven segment types (A, F, G) are in one data set group (data set group 1), another three of the seven segment types (B, C, D) are in another data set group (data set group 2), and the remaining segment type (E) is in yet another data set group (data set group 3). The lowest level segments within data set group 1 are the first level child segments. The F and G segment types are boundary child segments, as noted above in FIG. 2A. Segment types F and G each have only one segment. It is noted that having only one segment does not prohibit a segment type from being a boundary child segment type. Boundary child segment populations which include only one segment are not disorganized, and therefore would not benefit from reorganization.

In data set group 2, the D segment type is a boundary parent segment. All of the children of the parent segment D2 are in a different data set group from their parent (i.e., the D2 segment is in data set group 2 and the children of the D2 segment are in data set group 3). Since there is more than one segment of type D (i.e., D1 and D2), the type D segment may also be referred to as a boundary twin chain, as noted above. As such, if the segment type D boundary twin chain spans more than one block and the segment type D boundary parent segments are actually small enough to fit in fewer blocks than they are currently distributed over, it is likely that better block organization may be obtained by reorganization of either the segment type D boundary twin chain or the entire database record. The second level child segment type C is a boundary child segment, as noted above in FIG. 2A. Segment type C has only one segment. It is noted that having only one segment does not prohibit a segment type from being a boundary child segment type. Boundary child segment populations which include only one segment are not disorganized, and therefore would not benefit from reorganization.

In data set group 3, the third level child segment type E is a boundary child segment, as noted above in FIG. 2A. The three third level child segments (E1, E2, E3) are boundary child segments. As noted above, if the segment type E boundary twin chain spans more than one block and the segment type E boundary child segments are actually small enough to fit in fewer blocks than they are currently distributed over, it is likely that better block organization may be obtained by reorganization of either the segment type E boundary twin chain or the entire database record.

Figure 3:
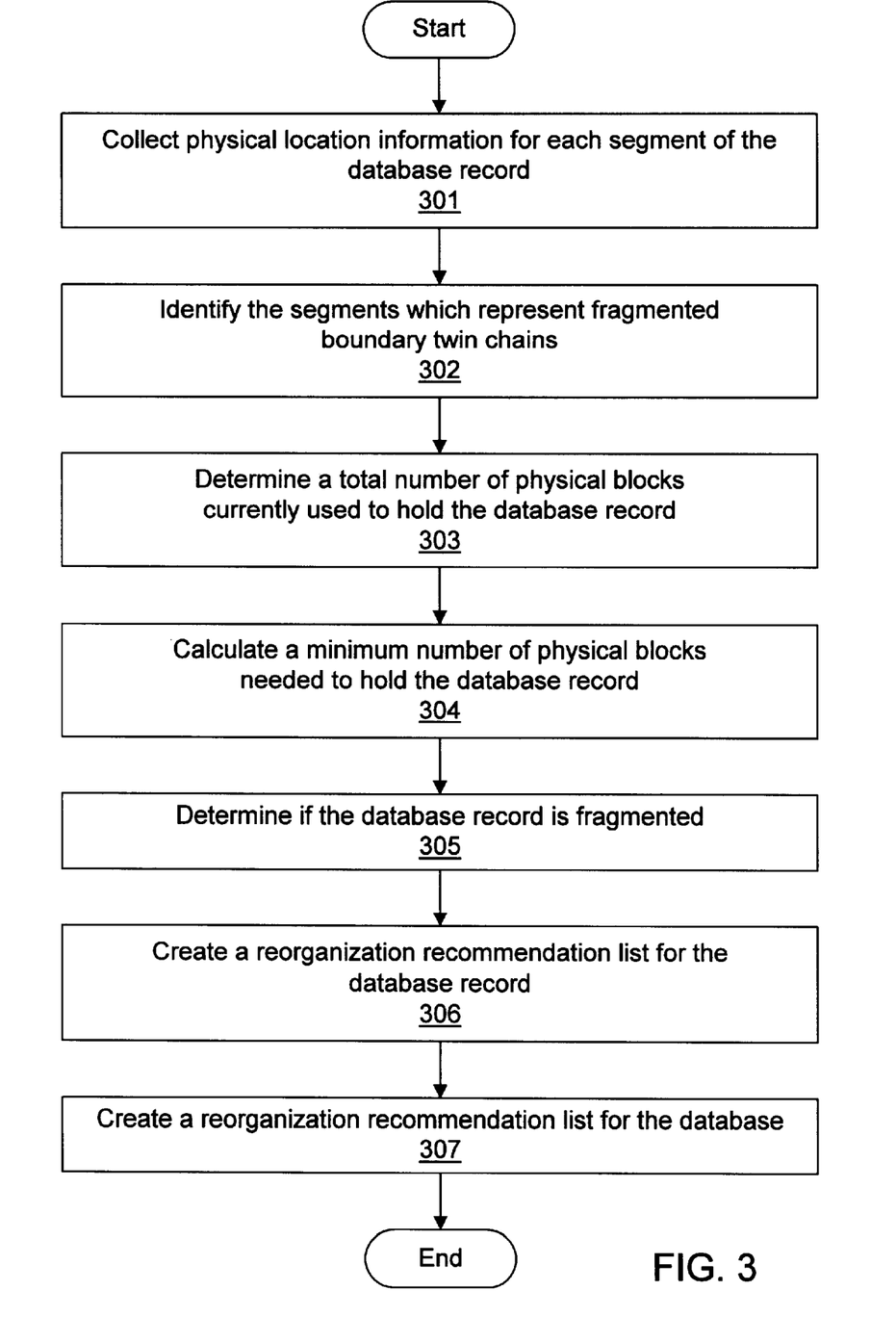
FIG. 3 is a flowchart illustrating analysis of the physical characteristics of a database record in an IMS database according to one embodiment.

FIG. 3: Analysis of a Database Record in an IMS Database

FIG. 3 is a flowchart of an embodiment of a system and method for analyzing the physical characteristics of a database record in an IMS database.

In step 301 physical location information may be collected for each segment of the database record. This physical location information may be collected by tracing the database retrieval process. The physical location information may include one or more of the following: a segment code, a partition number, a data set group number, a relative byte address (RBA), and a length in bytes. The database retrieval process for each database record may begin at the root segment of the database record and traverse the child segments of the database record in hierarchical order, e.g., top to bottom, left to right. The database retrieval process preferably identifies the segment code causing the first reference to a block and the number of segments retrieved from the block before fetching a new block.

In step 302 the collected physical location information may be used to identify the segments which represent fragmented boundary twin chains. As noted above, a twin chain is a collection of segments of the same type that have the same parent. A boundary parent segment is a parent segment, other than a root segment, that exists in a data set group as the lowest level segment in the data set group (i.e., all children of the parent segment are in a different data set group). If two or more boundary parent segments exist under the same parent, the boundary parent segments may also be referred to as a boundary twin chain. A boundary child segment is a non-parent segment that exists as the lowest level segment in the database hierarchy. Boundary child segments may reside in any data set group. Boundary child or boundary parent segments may also be referred to as boundary twin chains when a second segment of a particular segment type is created. A fragmented boundary twin chain is a boundary twin chain that spans more blocks than actually required.

In one embodiment, the process of identifying a group of segments which represents a fragmented boundary twin chain begins with determining if a boundary twin chain exists for the segment. For those segments which represent a boundary twin chain, two calculations are preferably performed to determine if the boundary twin chain is fragmented. The first calculation may determine a total number of physical blocks currently used to hold the boundary twin chain. The second calculation may determine a minimum number of physical blocks needed to hold the boundary twin chain. The total number of physical blocks and the minimum number of physical blocks are used to determine if the boundary twin chain may be fragmented. This may be done a number of ways. For example, if the total number of physical blocks currently used to hold the boundary twin chain exceeds the minimum number of physical blocks needed to hold the boundary twin chain by a pre-determined number of physical blocks, the boundary twin chain may be fragmented. A ratio of the total number of physical blocks and the minimum number of physical blocks may also be used, as well as other methods.

In step 303 a total number of physical blocks currently used to hold the database record may be determined. The physical location information may be used to determine the total number.

In step 304 a minimum number of physical blocks needed to hold the database record may be calculated. The physical location information may be used to calculate the minimum number.

In step 305 the method determines if the database record may be fragmented by using or comparing the previous two calculations of the total number of physical blocks currently used to hold the database record and the minimum number of physical blocks needed to hold the database record. For example, if the total number of physical blocks currently used to hold the database record exceeds the minimum number of physical blocks needed to hold the database record by a user-specified number of physical blocks, then the database record may be considered to be fragmented. The method may also use the total number of physical blocks and the minimum number of physical blocks to determine a ratio or percentage to determine if the database record may be fragmented.

In step 306 a reorganization recommendation list for the database record may be created. The reorganization recommendation list may include information indicating whether the database record is recommended to be reorganized, wherein the recommendation is based on the determination in step 305. Thus if the method in step 305 determines that the database record is fragmented then the reorganization recommendation list would contain an entry for the database record itself indicating that the database record is recommended to be reorganized, and if the method in step 305 determines that the database record is not fragmented then the reorganization recommendation list would contain an entry for the database record itself indicating that the database record is not recommended to be reorganized. This reorganization recommendation list may include one or more of the following: an entry for the database record itself indicating whether or not the database record is recommended to be reorganized, the minimum number of blocks needed to hold the database record, the currently used number of blocks for the database record, and entries for each element on the list of fragmented boundary twin chains.

In step 307, the reorganization recommendation list may then be used to reorganize the database. For example, the entries in the reorganization recommendation list may be examined, and individual database records may be selectively reorganized based on the recommendations in the reorganization recommendation list. Alternatively, the reorganization recommendation list may be used for analysis by a database administrator to determine if possible modifications to the structure of the database would decrease the likelihood of fragmentation of database records.

Figure 4:
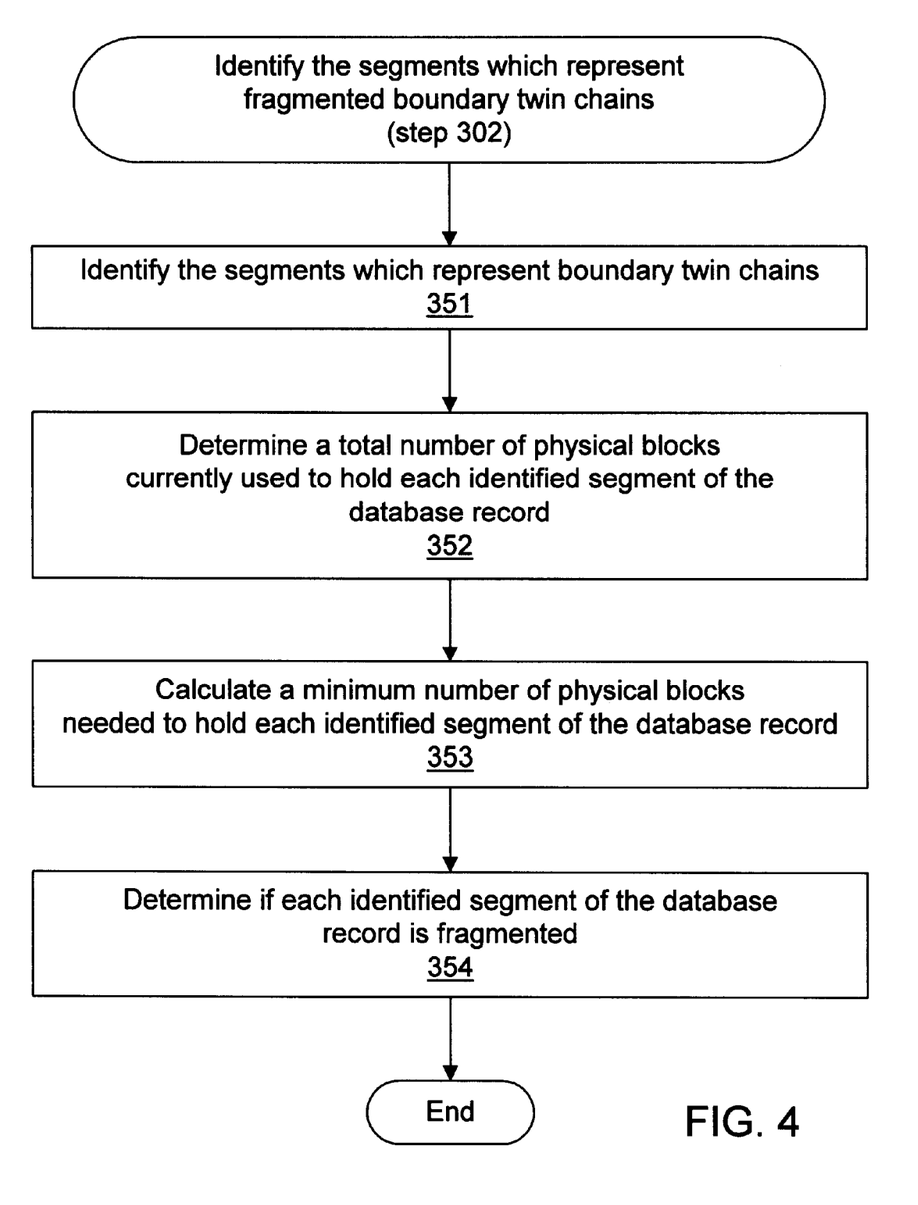
FIG. 4 is a flowchart illustrating analysis of the physical characteristics of twin chain segments of a database record in an IMS database according to one embodiment.

FIG. 4: Analysis of Twin Chain Segments of a Database Record in an IMS Database

FIG. 4 is a flowchart of an embodiment of a system and method for analyzing the physical characteristics of twin chain segments of a database record in an IMS database, as performed in step 302 in FIG. 3.

In step 351 the collected physical location information may be used to identify the segments which represent boundary twin chains. As noted above, boundary child or boundary parent segments may be referred to as boundary twin chains when a second segment of a particular segment type is created.

In step 352 a total number of physical blocks currently used to hold the boundary twin chain may be determined. The physical location information may be used to determine the total number.

In step 353 a minimum number of physical blocks needed to hold the boundary twin chain may be calculated. The physical location information may be used to calculate the minimum number.

In step 354 the method determines if the boundary twin chain may be fragmented by using or comparing the previous two calculations of the total number of physical blocks currently used to hold the boundary twin chain and the minimum number of physical blocks needed to hold the boundary twin chain. For example, if the total number of physical blocks currently used to hold the boundary twin chain exceeds the minimum number of physical blocks needed to hold the boundary twin chain by a user-specified number of physical blocks, then the boundary twin chain may be considered to be fragmented. The method may also use the total number of physical blocks and the minimum number of physical blocks to determine a ratio or percentage to determine if the boundary twin chain may be fragmented, as well as other methods.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for analyzing physical characteristics of a database record in an Information Management System (IMS) database, the method comprising:

tracing database retrieval to collect physical location information for each segment of the database record;

identifying one or more segments which represent a fragmented boundary twin chain using the collected physical location information for each segment of the database record;

creating a list of fragmented boundary twin chains in response to identifying one or more segments which represent a fragmented boundary twin chain;

determining a total number of physical blocks currently used to hold the database record, wherein said determining uses the physical location information of the segments of the database record;

calculating a minimum number of physical blocks needed to hold the database record, wherein said calculating uses the physical location information of the segments of the database record; and determining if the database record is fragmented in response to the total number of physical blocks currently used and the minimum number of physical blocks needed to hold the database record.

2. The method of claim 1, further comprising:

creating a reorganization recommendation list for the database record in response to determining whether the database record is fragmented.

3. The method of claim 2, wherein the reorganization recommendation list for the database record comprises an entry for the database record indicating whether or not the database record is recommended to be reorganized.

4. The method of claim 2, wherein the reorganization recommendation list for the database record comprises a minimum number of blocks needed to hold the database record, and a currently used number of blocks for the database record.

5. The method of claim 2, wherein the reorganization recommendation list for the database record comprises entries for each element on the list of fragmented boundary twin chains.

6. The method of claim 2, further comprising:

reorganizing the database record in response to the reorganization recommendation list.

7. The method of claim 2, wherein the method is performed for a plurality of database records in the IMS database;

wherein a plurality of reorganization recommendation lists are created, wherein at least one reorganization recommendation list is created for each of the plurality of database records;

the method further comprising analyzing the plurality of reorganization recommendation lists to determine a reorganization for the IMS database.

8. The method of claim 7, further comprising:

restructuring the database in response to the reorganization recommendation list.

9. The method of claim 2, wherein the physical location information for each segment of the database record comprises a segment code.

10. The method of claim 2, wherein the physical location information for each segment of the database record comprises a partition number.

11. The method of claim 2, wherein the physical location information for each segment of the database record comprises a data set group number.

12. The method of claim 2, wherein the physical location information for each segment of the database record comprises a relative byte address (RBA).

13. The method of claim 2, wherein the physical location information for each segment of the database record comprises a length in bytes.

14. The method of claim 2, wherein tracing database retrieval comprises traversing the database record beginning at the root segment of the database record and continuing to each child segment of the database record in hierarchical order and identifying the segment code causing the first reference to a block and the number of segments retrieved from the block before fetching a new block.

15. The method of claim 2, wherein the fragmented boundary twin chain is a twin chain comprising a lowest level of a hierarchy leg within a particular data set group.

16. The method of claim 2, wherein the fragmented boundary twin chain is a twin chain comprising a last level of a hierarchy leg.

17. The method of claim 2, wherein identifying one or more segments which represent the fragmented boundary twin chain comprises:

identifying one or more segments comprising a twin chain wherein the twin chain comprises a lowest level of a hierarchy leg within a particular data set group;

determining a total number of physical blocks currently used to hold each identified segment of the database record, wherein said determining uses the physical location information of the segments of the database record;

calculating a minimum number of physical blocks needed to hold each identified segment of the database record, wherein said calculating uses the physical location information of the segments of the database record;

determining if each identified segment of the database record is fragmented in response to the total number of physical blocks currently used and the minimum number of physical blocks needed to hold each identified segment of the database record.

18. The method of claim 2, wherein identifying one or more segments which represent the fragmented boundary twin chain comprises:

identifying one or more segments comprising a twin chain wherein the twin chain comprises a last level of a hierarchy leg;

determining a total number of physical blocks currently used to hold each identified segment of the database record, wherein said determining uses the physical location information of the segments of the database record;

calculating a minimum number of physical blocks needed to hold each identified segment of the database record, wherein said calculating uses the physical location information of the segments of the database record;

determining if each identified segment of the database record is fragmented in response to the total number of physical blocks currently used and the minimum number of physical blocks needed to hold each identified segment of the database record.

19. The method of claim 2, wherein a fragmented database record is one in which the total number of physical blocks currently used to hold the database record exceeds the minimum number of physical blocks needed to hold the database record by a pre-determined number of physical blocks.

20. The method of claim 2, analyzing the list of fragmented boundary twin chains to identify those fragmented boundary twin chains which, if reorganized, would lower the total number of physical blocks currently used to hold the database record.

21. A method for analyzing physical characteristics of an Information Management System (IMS) database, wherein the IMS database includes a plurality of database records, the method comprising:

for each database record, performing steps (a)–(g) as follows:
 (a) tracing database retrieval to collect physical location information for each segment of the database record;
 (b) identifying one or more segments which represent a fragmented boundary twin chain using the collected physical location information for each segment of the database record;
 (c) creating a list of fragmented boundary twin chains in response to identifying one or more segments which represent a fragmented boundary twin chain;
 (d) determining a total number of physical blocks currently used to hold the database record, wherein said determining uses the physical location information of the segments of the database record;
 (e) calculating a minimum number of physical blocks needed to hold the database record, wherein said calculating uses the physical location information of the segments of the database record;
 (f) determining if the database record is fragmented in response to the total number of physical blocks currently used and the minimum number of physical blocks needed to hold the database record;
 (g) creating a reorganization recommendation list for the database record in response to said steps (a)–(f);

creating a separate reorganization recommendation list for the database in response to the reorganization recommendation lists created for each database record, wherein the separate reorganization recommendation list for the database indicates reorganization for only a subset of the database records.

22. A method for analyzing physical characteristics of a database record in a non-relational database, the method comprising:

tracing database retrieval to collect physical location information for each segment of the database record;
identifying one or more segments which represent a fragmented boundary twin chain using the collected physical location information for each segment of the database record;
creating a list of fragmented boundary twin chains in response to identifying one or more segments which represent a fragmented boundary twin chain;
determining a total number of physical blocks currently used to hold the database record, wherein said determining uses the physical location information of the segments of the database record;
calculating a minimum number of physical blocks needed to hold the database record, wherein said calculating uses the physical location information of the segments of the database record; and
determining if the database record is fragmented in response to the total number of physical blocks currently used and the minimum number of physical blocks needed to hold the database record.

23. The method of claim 22, further comprising:
creating a reorganization recommendation list for the database record in response to determining whether the database record is fragmented.

24. A system for analyzing physical characteristics of a database record, the system comprising:
a network;
a CPU coupled to the network;
a memory coupled to the CPU which stores an IMS database;
a system memory coupled to the CPU, wherein the system memory stores one or more computer programs executable by the CPU;
wherein the computer programs are executable to:
 trace database retrieval to collect physical location information for each segment of the database record;
 identify one or more segments which represent a fragmented boundary twin chain using the collected physical location information for each segment of the database record;
 create a list of fragmented boundary twin chains in response to identifying one or more segments which represent a fragmented boundary twin chain;
 determine a total number of physical blocks currently used to hold the database record, wherein said determining uses the physical location information of the segments of the database record;
 calculate a minimum number of physical blocks needed to hold the database record, wherein said calculating uses the physical location information of the segments of the database record; and
 determine if the database record is fragmented in response to the total number of physical blocks currently used and the minimum number of physical blocks needed to hold the database record.

25. The system of claim 24, wherein the computer programs are further executable to create a reorganization recommendation list for the database record in response to determining whether the database record is fragmented.

26. The system of claim 25, wherein the reorganization recommendation list for the database record comprises an entry for the database record indicating whether or not the database record is recommended to be reorganized.

27. The system of claim 25, wherein the reorganization recommendation list for the database record comprises a minimum number of blocks needed to hold the database record, and a currently used number of blocks for the database record.

28. The system of claim 25, wherein the reorganization recommendation list for the database record comprises entries for each element on the list of fragmented boundary twin chains.

29. The system of claim 25, wherein the computer programs are further executable to reorganize the database record in response to the reorganization recommendation list.

30. The system of claim 25, wherein the system is performed for a plurality of database records in the IMS database;
  wherein the computer programs are further executable to create a plurality of reorganization recommendation lists, wherein at least one reorganization recommendation list is created for each of the plurality of database records;
  wherein the computer programs are further executable to analyze the plurality of reorganization recommendation lists to determine a reorganization for the IMS database.

31. The system of claim 30, wherein the computer programs are further executable to restructure the database in response to the reorganization recommendation list.

32. The system of claim 25, wherein the physical location information for each segment of the database record comprises a segment code.

33. The system of claim 25, wherein the physical location information for each segment of the database record comprises a partition number.

34. The system of claim 25, wherein the physical location information for each segment of the database record comprises a data set group number.

35. The system of claim 25, wherein the physical location information for each segment of the database record comprises a relative byte address (RBA).

36. The system of claim 25, wherein the physical location information for each segment of the database record comprises a length in bytes.

37. The system of claim 25, wherein in tracing database retrieval, the computer programs are further executable to traverse the database record beginning at the root segment of the database record and continuing to each child segment of the database record in hierarchical order and identifying the segment code causing the first reference to a block and the number of segments retrieved from the block before fetching a new block.

38. The system of claim 25, wherein the fragmented boundary twin chain is a twin chain comprising a lowest level of a hierarchy leg within a particular data set group.

39. The system of claim 25, wherein the fragmented boundary twin chain is a twin chain comprising a last level of a hierarchy leg.

40. The system of claim 25, wherein in identifying one or more segments which represent the fragmented boundary twin chain, the computer programs are further executable to:
  identify one or more segments comprising a twin chain wherein the twin chain comprises a lowest level of a hierarchy leg within a particular data set group;
  determine a total number of physical blocks currently used to hold each identified segment of the database record, wherein said determining uses the physical location information of the segments of the database record;
  calculate a minimum number of physical blocks needed to hold each identified segment of the database record, wherein said calculating uses the physical location information of the segments of the database record;
  determine if each identified segment of the database record is fragmented in response to the total number of physical blocks currently used and the minimum number of physical blocks needed to hold each identified segment of the database record.

41. The system of claim 25, wherein in identifying one or more segments which represent the fragmented boundary twin chain the computer programs are further executable to:
  identify one or more segments comprising a twin chain wherein the twin chain comprises a last level of a hierarchy leg;
  determine a total number of physical blocks currently used to hold each identified segment of the database record, wherein said determining uses the physical location information of the segments of the database record;
  calculate a minimum number of physical blocks needed to hold each identified segment of the database record, wherein said calculating uses the physical location information of the segments of the database record;
  determine if each identified segment of the database record is fragmented in response to the total number of physical blocks currently used and the minimum number of physical blocks needed to hold each identified segment of the database record.

42. The system of claim 25, wherein a fragmented database record is one in which the total number of physical blocks currently used to hold the database record exceeds the minimum number of physical blocks needed to hold the database record by a predetermined number of physical blocks.

43. The system of claim 25, wherein the computer programs are further executable to analyze the list of fragmented boundary twin chains to identify those fragmented boundary twin chains which, if reorganized, would lower the total number of physical blocks currently used to hold the database record.

44. A system comprising:
  a network;
  a CPU coupled to the network;
  a memory coupled to the CPU which stores an IMS database;
  a system memory coupled to the CPU, wherein the system memory stores one or more computer programs executable by the CPU;
  wherein the IMS database includes a plurality of database records;
  wherein the computer programs are executable to perform steps (a)–(g) for each database record, as follows:
    (a) trace database retrieval to collect physical location information for each segment of the database record;
    (b) identify one or more segments which represent a fragmented boundary twin chain using the collected physical location information for each segment of the database record;
    (c) create a list of fragmented boundary twin chains in response to identifying one or more segments which represent a fragmented boundary twin chain;
    (d) determine a total number of physical blocks currently used to hold the database record, wherein said determining uses the physical location information of the segments of the database record;
    (e) calculate a minimum number of physical blocks needed to hold the database record, wherein said calculating uses the physical location information of the segments of the database record;
    (f) determine if the database record is fragmented in response to the total number of physical blocks currently used and the minimum number of physical blocks needed to hold the database record;
    (g) create a reorganization recommendation list for the database record in response to said steps (a)–(f);
  wherein the computer programs are further executable to create a separate reorganization recommendation list for the database in response to the reorganization recommendation lists created for each database record, wherein the separate reorganization recommendation list for the database indicates reorganization for only a subset of the database records.

45. A system for analyzing physical characteristics of a database record, the system comprising:

a network;

a CPU coupled to the network;

a memory coupled to the CPU which stores a non-relational database;

a system memory coupled to the CPU, wherein the system memory stores one or more computer programs executable by the CPU;

wherein the computer programs are executable to:

trace database retrieval to collect physical location information for each segment of the database record;

identify one or more segments which represent a fragmented boundary twin chain using the collected physical location information for each segment of the database record;

create a list of fragmented boundary twin chains in response to identifying one or more segments which represent a fragmented boundary twin chain;

determine a total number of physical blocks currently used to hold the database record, wherein said determining uses the physical location information of the segments of the database record;

calculate a minimum number of physical blocks needed to hold the database record, wherein said calculating uses the physical location information of the segments of the database record; and determine if the database record is fragmented in response to the total number of physical blocks currently used and the minimum number of physical blocks needed to hold the database record.

46. The system of claim 45, wherein the computer programs are further executable to create a reorganization recommendation list for the database record in response to determining whether the database record is fragmented.

47. A carrier medium which stores program instructions for analyzing physical characteristics of a database record in an Information Management System (IMS) database, wherein the program instructions are executable to implement:

tracing database retrieval to collect physical location information for each segment of the database record;

identifying one or more segments which represent a fragmented boundary twin chain using the collected physical location information for each segment of the database record;

creating a list of fragmented boundary twin chains in response to identifying one or more segments which represent a fragmented boundary twin chain;

determining a total number of physical blocks currently used to hold the database record, wherein said determining uses the physical location information of the segments of the database record;

calculating a minimum number of physical blocks needed to hold the database record, wherein said calculating uses the physical location information of the segments of the database record; and determining if the database record is fragmented in response to the total number of physical blocks currently used and the minimum number of physical blocks needed to hold the database record.

48. The carrier medium of claim 47, wherein the program instructions are further executable to implement creating a reorganization recommendation list for the database record in response to determining whether the database record is fragmented.

49. The carrier medium of claim 48, wherein the reorganization recommendation list for the database record comprises an entry for the database record indicating whether or not the database record is recommended to be reorganized.

50. The carrier medium of claim 48, wherein the reorganization recommendation list for the database record comprises a minimum number of blocks needed to hold the database record, and a currently used number of blocks for the database record.

51. The carrier medium of claim 48, wherein the reorganization recommendation list for the database record comprises entries for each element on the list of fragmented boundary twin chains.

52. The carrier medium of claim 48, wherein the program instructions are further executable to implement reorganizing the database record in response to the reorganization recommendation list.

53. The carrier medium of claim 48, wherein the program instructions are performed for a plurality of database records in the IMS database;

wherein the program instructions are further executable to implement creating a plurality of reorganization recommendation lists, wherein at least one reorganization recommendation list is created for each of the plurality of database records;

wherein the program instructions are further executable to implement analyzing the plurality of reorganization recommendation lists to determine a reorganization for the IMS database.

54. The carrier medium of claim 53, wherein the program instructions are further executable to implement restructuring the database in response to the reorganization recommendation list.

55. The carrier medium of claim 48, wherein the physical location information for each segment of the database record comprises a segment code.

56. The carrier medium of claim 48, wherein the physical location information for each segment of the database record comprises a partition number.

57. The carrier medium of claim 48, wherein the physical location information for each segment of the database record comprises a data set group number.

58. The carrier medium of claim 48, wherein the physical location information for each segment of the database record comprises a relative byte address (RBA).

59. The carrier medium of claim 48, wherein the physical location information for each segment of the database record comprises a length in bytes.

60. The carrier medium of claim 48, wherein in tracing database retrieval the program instructions are further executable to implement traversing the database record beginning at the root segment of the database record and continuing to each child segment of the database record in hierarchical order and identifying the segment code causing the first reference to a block and the number of segments retrieved from the block before fetching a new block.

61. The carrier medium of claim 48, wherein the fragmented boundary twin chain is a twin chain comprising a lowest level of a hierarchy leg within a particular data set group.

62. The carrier medium of claim 48, wherein the fragmented boundary twin chain is a twin chain comprising a last level of a hierarchy leg.

63. The carrier medium of claim 48, wherein in identifying one or more segments which represent the fragmented boundary twin chain the program instructions are further executable to implement:

identifying one or more segments comprising a twin chain wherein the twin chain comprises a lowest level of a hierarchy leg within a particular data set group;

determining a total number of physical blocks currently used to hold each identified segment of the database record, wherein said determining uses the physical location information of the segments of the database record;

calculating a minimum number of physical blocks needed to hold each identified segment of the database record, wherein said calculating uses the physical location information of the segments of the database record;

determining if each identified segment of the database record is fragmented in response to the total number of physical blocks currently used and the minimum number of physical blocks needed to hold each identified segment of the database record.

64. The carrier medium of claim 48, wherein in identifying one or more segments which represent the fragmented boundary twin chain the program instructions are further executable to implement:

identifying one or more segments comprising a twin chain wherein the twin chain comprises a last level of a hierarchy leg;

determining a total number of physical blocks currently used to hold each identified segment of the database record, wherein said determining uses the physical location information of the segments of the database record;

calculating a minimum number of physical blocks needed to hold each identified segment of the database record, wherein said calculating uses the physical location information of the segments of the database record;

determining if each identified segment of the database record is fragmented in response to the total number of physical blocks currently used and the minimum number of physical blocks needed to hold each identified segment of the database record.

65. The carrier medium of claim 48, wherein a fragmented database record is one in which the total number of physical blocks currently used to hold the database record exceeds the minimum number of physical blocks needed to hold the database record by a pre-determined number of physical blocks.

66. The carrier medium of claim 48, wherein the program instructions are further executable to implement analyzing the list of fragmented boundary twin chains to identify those fragmented boundary twin chains which, if reorganized, would lower the total number of physical blocks currently used to hold the database record.

67. A carrier medium which stores program instructions for analyzing physical characteristics of an Information Management System (IMS) database:

wherein the IMS database includes a plurality of database records;

wherein the program instructions are executable to implement performing steps (a)–(g) for each database record, as follows:

(a) tracing database retrieval to collect physical location information for each segment of the database record;

(b) identifying one or more segments which represent a fragmented boundary twin chain using the collected physical location information for each segment of the database record;

(c) creating a list of fragmented boundary twin chains in response to identifying one or more segments which represent a fragmented boundary twin chain;

(d) determining a total number of physical blocks currently used to hold the database record, wherein said determining uses the physical location information of the segments of the database record;

(e) calculating a minimum number of physical blocks needed to hold the database record, wherein said calculating uses the physical location information of the segments of the database record;

(f) determining if the database record is fragmented in response to the total number of physical blocks currently used and the minimum number of physical blocks needed to hold the database record;

(g) creating a reorganization recommendation list for the database record in response to said steps (a)–(f);

wherein the program instructions are further executable to implement creating a separate reorganization recommendation list for the database in response to the reorganization recommendation lists created for each database record, wherein the separate reorganization recommendation list for the database indicates reorganization for only a subset of the database records.

68. A carrier medium which stores program instructions for analyzing physical characteristics of a database record in a non-relational database, wherein the program instructions are executable to implement:

tracing database retrieval to collect physical location information for each segment of the database record;

identifying one or more segments which represent a fragmented boundary twin chain using the collected physical location information for each segment of the database record;

creating a list of fragmented boundary twin chains in response to identifying one or more segments which represent a fragmented boundary twin chain;

determining a total number of physical blocks currently used to hold the database record, wherein said determining uses the physical location information of the segments of the database record;

calculating a minimum number of physical blocks needed to hold the database record, wherein said calculating uses the physical location information of the segments of the database record; and     determining if the database record is fragmented in response to the total number of physical blocks currently used and the minimum number of physical blocks needed to hold the database record.

69. The carrier medium of claim 68, wherein the program instructions are further executable to implement:

creating a reorganization recommendation list for the database record in response to determining whether the database record is fragmented.

70. The carrier medium of claim 48, wherein the carrier medium is a memory medium.

* * * * *